United States Patent [19]

Konno et al.

[11] Patent Number: 5,392,356
[45] Date of Patent: Feb. 21, 1995

[54] MOBILE TELEPHONE TERMINAL AND METHOD OF PREVENTING UNLAWFUL USE THEREOF

[75] Inventors: Masahiro Konno; Tetsuya Hanawa, both of Kawasaki, Japan

[73] Assignee: Fujitsu Limited, Kanagawa, Japan

[21] Appl. No.: 111,838

[22] Filed: Aug. 25, 1993

[30] Foreign Application Priority Data

Jan. 21, 1993 [JP] Japan .................. 5-008169

[51] Int. Cl.⁶ .................................................. H04K 1/00
[52] U.S. Cl. .......................................... 380/23; 380/49
[58] Field of Search ...................................... 380/23, 49

[56] References Cited

U.S. PATENT DOCUMENTS

| | | | |
|---|---|---|---|
| 5,204,902 | 4/1993 | Reeds et al. | 380/23 |
| 5,237,612 | 8/1993 | Raith | 380/23 |
| 5,282,250 | 1/1994 | Dent et al. | 380/23 |

*Primary Examiner*—David C. Cain

[57] ABSTRACT

A first ID code ESN (electronic serial number) for apparatus identification and a second ID code MIN (mobile identification number) such as a telephone number are stored beforehand in a non-volatile memory of a mobile telephone terminal. The mobile telephone terminal transmits these ID codes to a network at the time of communication, and whether or not this set of first and second ID codes has been registered is discriminated on the network side. Communication is allowed if the ID codes have been registered. In order to prevent unlawful use of the mobile telephone terminal in mobile communication, (1) the first ID code is encrypted on the side of a writing device and then inputted to the mobile telephone terminal when the first ID code is written in the non-volatile memory of the mobile telephone terminal, (2) the mobile telephone terminal writes the encrypted first ID code in the non-volatile memory as is, and (3) the encrypted first ID code is decoded at the time of communication and transmitted to the network along with the second ID code.

9 Claims, 10 Drawing Sheets

| F | E |
|---|---|
| H | G |
| B | A |
| D | C |

FIG.7(c)

| F' | E' |
|---|---|
| H' | G' |
| B' | A' |
| D' | C' |

MOBILE TELEPHONE TERMINAL AND METHOD OF PREVENTING UNLAWFUL USE THEREOF

BACKGROUND OF THE INVENTION

This invention relates to a mobile telephone terminal and a method of preventing the unlawful use thereof. More particularly, the invention relates to a mobile telephone terminal, as well as a method of preventing its unlawful use, in which it is possible to prevent communication achieved by unlawful use of the terminal by illegally writing a first ID code for apparatus identification and a second ID code such as a telephone number in a non-volatile memory of the mobile telephone terminal.

A mobile telephone terminal (portable telephone terminal or car telephone terminal) used in an AMPS (advanced mobile phone system) of the kind employed in North America, Australia and some other countries is provided with two types of ID numbers referred to as a MIN (mobile identification number) and an ESN (electronic serial number). These ID numbers are stored in a non-volatile memory such as an EEPROM (electrically erasable programmable read-only memory) incorporated within the terminal. MIN corresponds to the telephone number and ESN corresponds to the manufacturing serial number. When a call is placed, these two ID codes are transmitted from the mobile telephone terminal to the network, and whether the two ID codes have been registered or not is checked on the network side. A speech path is established between the calling and called parties if it found that the two ID codes have been registered, and the calling party is billed in accordance with the duration of the call and the distance. However, there are instances in which the MIN and ESN of the legal user are acquired unlawfully and written in the EEPROM of another mobile telephone terminal, which is then used for unlawful communication. Communication by such unlawful use of a mobile telephone terminal is almost impossible to deal with on the exchange side, as a result of which the legitimate user is billed for use of the line. Consequently, there is demand for a method of preventing unlawful use of mobile telephone terminals, through which method it is possible to refuse communication based upon unlawful use of the mobile telephone terminal.

Figure 11:
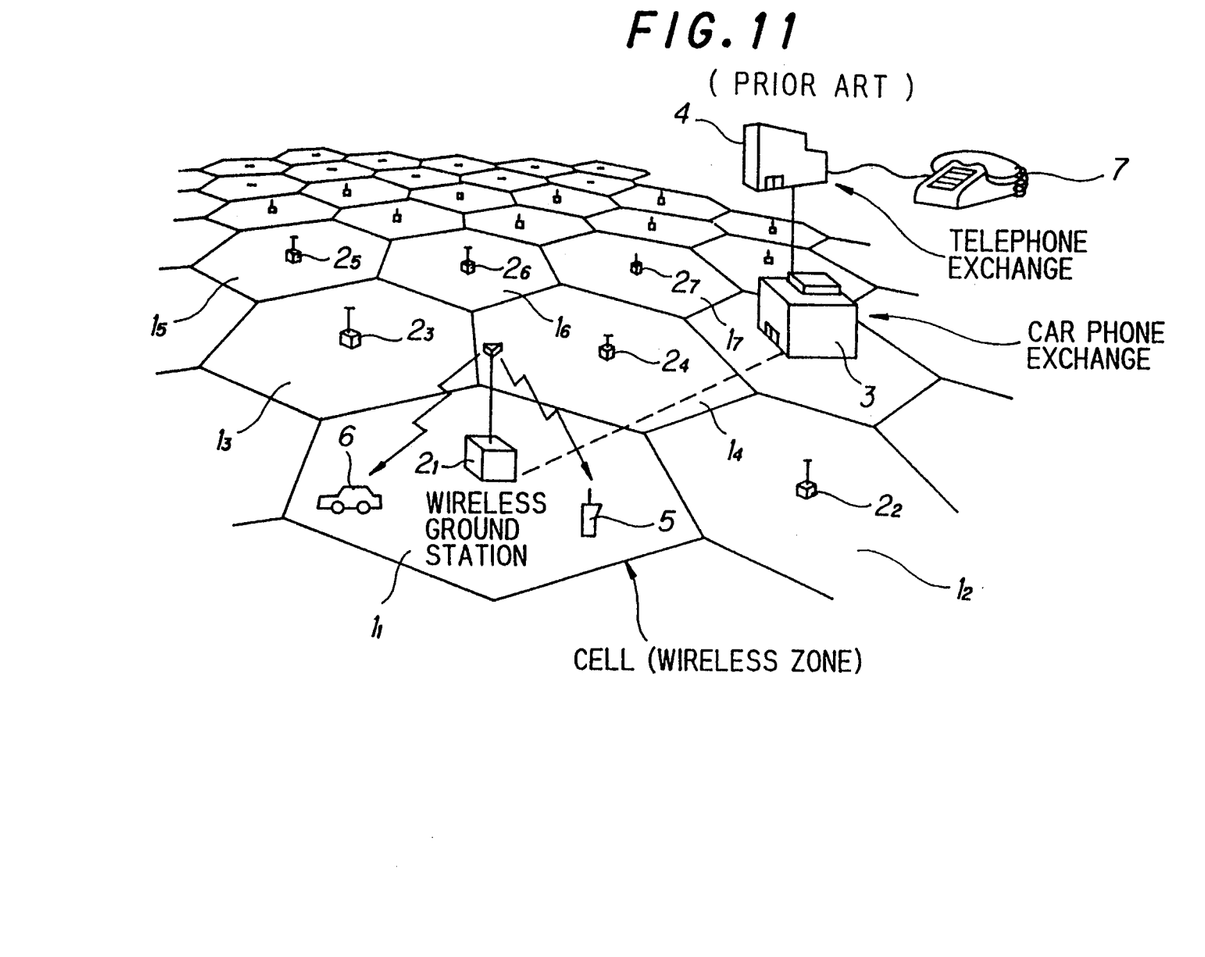
FIG. 11 is a diagram useful in describing a cellular-type telephone system.

The AMPS system is a mobile phone system of the cellular type. As shown in FIG. 11, a service region is subdivided into a number of cells (wireless zones) $1_1$, $1_2$, $1_3$, . . . , and the cells are provided with individual wireless base stations $2_1$, $2_2$, $2_3$, . . . , respectively. The wireless base stations are formed into groups each having several of the base stations, a wireless line-control station (not shown) is provided for each such group of wireless base stations, the wireless line-control stations are connected to a mobile phone exchange (hereinafter referred to as a car phone exchange) 3, and the car phone exchange 3 is connected to an exchange 4 of a public telephone network.

The cellular-type mobile phone system is so designed that as a portable telephone terminal 5 or car telephone terminal 6 moves, the wireless base stations that send and receive the radio waves are changed over from one to another so that communication can be achieved with an indoor fixed telephone 7 or another mobile telephone terminal. This makes it possible to carry on telephone conversations over a wide area and to increase the number of channels. The number of lines can be increased without limit as well.

As mentioned above, the two ID numbers (MIN and ESN) are stored in an internal non-volatile memory, such as an EEPROM, of the AMPS-type mobile telephone terminal, the two ID codes are sent to a network from the mobile telephone terminal when a call is placed, a check is made on the network side to determine if the two ID codes have been registered, and a speech path is established between the calling and called parties only if the two ID codes have been registered.

The ESN corresponds to the manufacturing serial number and is written in the EEPROM of the mobile telephone terminal by the manufacturer of the terminal. The mobile telephone terminal is then shipped. The MIN corresponds to the telephone number and is written in the EEPROM by the provider of communication service. More specifically, the user who has purchased the mobile telephone terminal brings the terminal to, say, the dealer of a communication service and registers the terminal so that it may receive the communication service. The dealer provides the mobile telephone terminal with the MIN and writes the MIN in the EEPROM of the terminal. The provider of the communication service reads the ESN, which has been written in the EEPROM of the mobile telephone terminal by the manufacturer, and registers the set of the ESN and MIN with the network.

When the two ID codes constituted by the ESN and MIN have thus been written in the EEPROM of the mobile telephone terminal and registered with the network, a call is capable of being placed using the mobile telephone terminal.

When power is supplied to the mobile telephone terminal, the terminal scans the paging channels of the surrounding wireless ground stations, receives the paging waves transmitted at all times from each wireless ground station and tunes to the channel of the station having the strongest signal. Thereafter, the terminal receives position information over this channel and compares this with position information already stored. If the two items of position information differ, the terminal reads the two ID codes ESN and MIN out of the EEPROM, transmits them to the wireless ground station over the paging channel and registers position with the car phone exchange 3. As a result, the mobile telephone terminal enters a waiting mode. When the mobile telephone terminal moves and the strength of the received signal weakens, the terminal performs scanning again.

When an outgoing call is placed, the calling party enters the other party's telephone number from a control panel and presses a transmission key, whereupon the mobile telephone terminal reads the two ID codes ESN and MIN out of the EEPROM. These ID codes and the called party's telephone number are then transmitted to the wireless ground station over the paging channel, and the wireless ground station responds by transmitting the received information to the wireless line-control station (not shown). The latter decides the speech channel, notifies the mobile telephone terminal via the wireless ground station and informs the car phone exchange 3 of the outgoing-call information and speech channel that has been decided. The car phone exchange 3 checks to determine whether the set of two ID codes ESN, MIN received has been registered and, if they have, connects the speech channel to the public telephone system. The mobile telephone terminal can then communicate with the called party's terminal via the designated speech channel. Further, the car phone exchange 3 increments the message rate, which is stored in correlation with the MIN of the calling terminal, in conformity with the duration of the call and call distance and bills the calling party accordingly. If the set of two ID codes ESN, MIN received has not been registered, the car phone exchange 3 does not connect the speech channel to the public telephone network.

Accordingly, if the MIN and ESN are registered with the network and written in the EEPROM of the mobile telephone terminal, then the terminal can be utilized. This means that an illegal user is capable of illicitly acquiring the MIN and ESN of the mobile telephone terminal possessed by the rightful user, writing the MIN and ESN in the EEPROM of another mobile telephone terminal and using the other terminal for communication. This can subject the rightful user, the provider of the communication service and the manufacturer of the mobile telephone terminal to tremendous losses. The technique employed by such an individual to unlawfully acquire the MIN and ESN of the mobile telephone terminal is to read out the data stored in the EEPROM of the terminal and analyze this data, whereby the MIN and ESN can be determined.

A conventional measure taken on the terminal side in order to prevent unlawful use is to encrypt the ID codes on the terminal side before writing them in the EEPROM, with the ID codes being deciphered and then transmitted at the time of communication. With such an expedient, the ID codes cannot be analyzed from the EEPROM by hardware means and therefore cannot be acquired in a simple manner.

Even if the measure described above is taken, however, ID codes such as the MIN and ESN can still be acquired by intercepting the communication between the mobile telephone terminal and the wireless ground station. In actuality, this method is already being used to acquire the ID codes unlawfully, encrypt and write them in the EEPROM of another mobile telephone terminal and use the other mobile telephone terminal for communication. Thus, the conventional method of making it impossible to read the ID codes out of the EEPROM is not satisfactory for preventing unlawful use of mobile telephone terminals.

SUMMARY OF THE INVENTION

Accordingly, an object of the present invention is to provide a method of preventing unlawful use of a mobile telephone terminal even if the ID codes are acquired unlawfully.

Another object of the present invention is to provide a method of preventing unlawful use of a mobile telephone terminal in which, even if the ID codes are acquired unlawfully, it is possible to protect the mobile telephone terminal against illegal use and illegal communication by arranging it so that the ID codes acquired by an illegal user cannot be written in the non-volatile memory of the terminal.

A further object of the invention is to provide a mobile telephone terminal the unlawful use of which can be prevented.

In order to attain the foregoing objects, the present invention provides a method of preventing unlawful use of a mobile telephone terminal comprising the steps of encrypting a first ID code on the side of a writing device and entering the encrypted first ID code (ESN) in the mobile telephone terminal when the first ID code is written in a non-volatile memory of the mobile telephone terminal, writing the encrypted first ID code in the non-volatile memory as is by the mobile telephone terminal, and decoding the encrypted first ID code at communication and transmitting the first ID code obtained to a network along with a second ID code (MIN). With such an arrangement, even if the ID codes such as the MIN and ESN are acquired by intercepting an exchange of communication between the mobile telephone terminal and the wireless ground station, the ID codes cannot be encrypted and written in the non-volatile memory without using an ID writing device possessed by the manufacturer of the mobile telephone terminal. This makes it possible to prevent unlawful use of the mobile telephone terminal.

The method of the invention further includes steps of combining data indicating validity of the first ID code with the first ID code and encrypting the resulting data on the side of the writing device, decoding the encrypted data by the mobile telephone terminal before the encrypted data entered is written in the non-volatile memory, judging whether the data indicating the validity of the first ID code is contained in the decoded data, and, if the data indicating validity is contained in the decoded, writing the encrypted data in the non-volatile memory as is. In accordance with this arrangement, the illegal user is incapable of writing the first ID code in the non-volatile memory without knowing the nature of the validity data. As a result, unlawful use of the mobile telephone terminal can be prevented.

The method of the invention further includes steps of monitoring number of tries at writing an ID code, and locking the mobile telephone terminal against use when the number of tries exceeds a set number. Thus, even if an illegal user attempts to write in an ID code illegally, the mobile telephone terminal is rendered unusable after a number of tries. This prevents against unlawful use of the mobile telephone terminal.

The method of the invention further includes steps of combining data indicating validity of the first ID code with the first ID code and encrypting the resulting data by the writing device, writing the entered encrypted data in the non-volatile memory by the mobile telephone terminal, decoding the encrypted data when power is supplied to the mobile telephone terminal, judging whether the data indicating the validity of the first ID code is contained in the decoded data, and, if the data indicating validity is not contained in the decoded data, rendering the mobile telephone terminal unusable. Thus, an illegal user cannot write the first and second ID codes in the non-volatile memory without knowing the nature of the validity data. This prevents against unlawful use of the mobile telephone terminal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 7(a–d) are a diagram for describing an encryption procedure;

FIG. 8 is a flowchart of processing for verifying the validity of an ID when a power supply is turned on;

DESCRIPTION OF THE PREFERRED EMBODIMENTS (a) Overview of the invention

Figure 1:
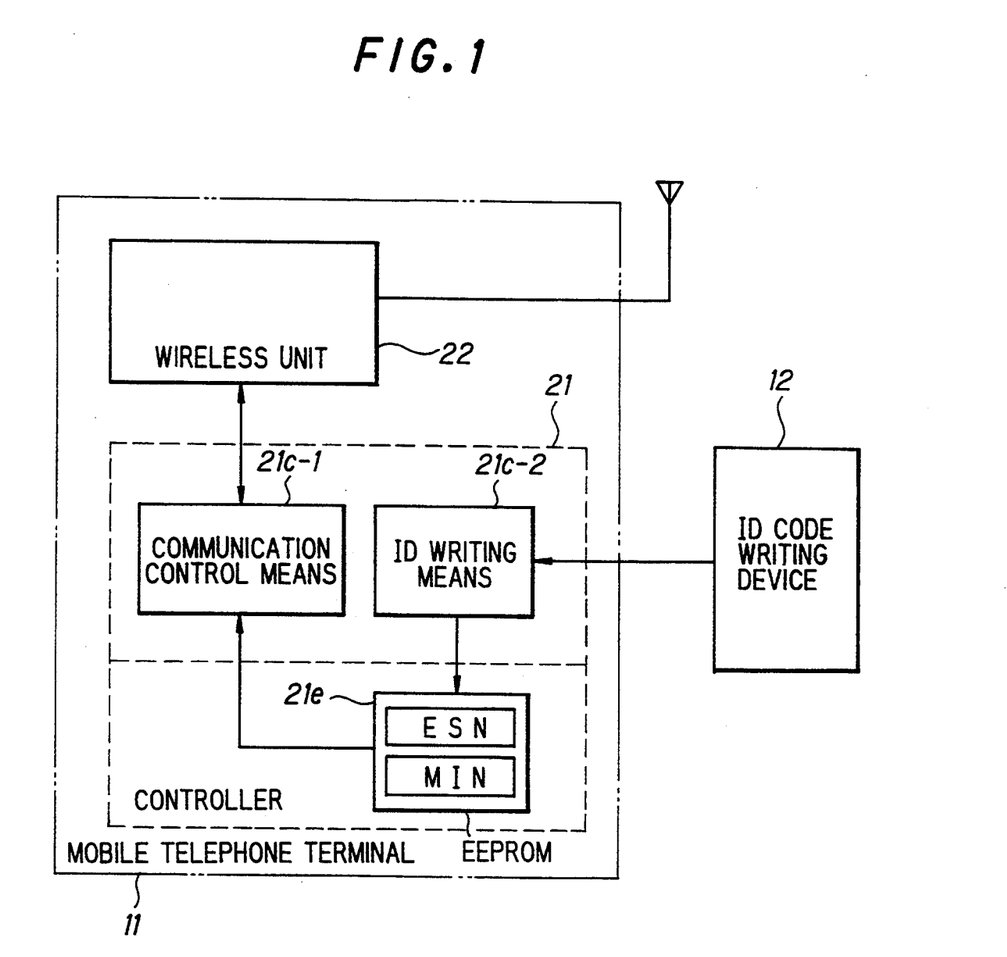
FIG. 1 is a block diagram useful in describing the principle of the present invention.

FIG. 1 is a block diagram illustrating the overall configuration of the present invention. Numeral 11 denotes a mobile telephone terminal, and numeral 12 represents an ID-code writing device for encrypting a first ID code (ESN) that identifies the apparatus and writing the encrypted ID code in an EEPROM incorporated within the mobile telephone terminal 11. The mobile telephone terminal 11 includes a controller 21 for controlling the terminal. The controller 21 has communication control means 21c-1 for executing communication processing, ID writing means 21c-2 that executes write processing for writing the encrypted first ID code in the EEPROM, a non-volatile memory 21e, such as an EEPROM, for storing the encrypted first ID code (ESN) and a second ID code (MIN) such as a telephone number. The mobile telephone terminal further includes a wireless unit 22 for sending and receiving a voice signal and data.

When the first ID code ESN for apparatus identification is written in the EEPROM 21e of the mobile telephone terminal 11, the ID-code writing device 12 encrypts the first ID code ESN and then enters the encrypted code to the mobile telephone terminal. The ID writing means 21c-2 of the mobile telephone terminal 11 writes the encrypted first ID code in the EEPROM 21e. At the time of communication, the communication control means 21c-1 decodes the encrypted first ID code and transmits the obtained first ID code ESN and the second ID code MIN to a network. Thus, encryption is performed on the side of the ID writing device 12. This means that even if the ID code such as MIN or ESN is acquired by intercepting the communication exchange between the mobile telephone terminal and a wireless ground station, the ID code cannot be encrypted and written in the EEPROM without using the ID writing device 12 possessed by the manufacturer of the mobile telephone terminal. This makes it possible to prevent unlawful use of the mobile telephone terminal.

Further, data indicating validity of the first ID code ESN is combined with the first ID code and the resulting data is encrypted by the writing device 12. Before writing the entered encrypted data in the EEPROM 1e, the ID writing means 21c-2 of the mobile telephone terminal 11 decodes the encrypted data and judges whether the data indicating the validity of the first ID code is contained in the decoded data. The encrypted data is written in the EEPROM as is only if the data indicative of validity is contained in the decoded data.

In accordance with this arrangement, an illegal user is incapable of writing the first ID code in the EEPROM, even if use is made of the ID writing device 12, without knowing the nature of the validity data. As a result, unlawful use of the mobile telephone terminal can be prevented.

Further, data indicating validity of the first ID code ESN is combined with the first ID code and the resulting ID code is encrypted by the writing device 12. The mobile telephone terminal 11 writes the entered encrypted data in the EEPROM 21e. When the power supply of the mobile telephone terminal is turned on, the terminal 11 decodes the encrypted data and judges whether the data indicating the validity of the first ID code is contained in the decoded data. The mobile telephone terminal is made unusable if data indicative of validity is not contained in the decoded data. In accordance with this arrangement, an illegal user is incapable of using the mobile telephone terminal without knowing the nature of the validity data. As a result, unlawful use of the mobile telephone terminal can be prevented.

Furthermore, the ID writing means 21c-2 monitors the number of tries at writing the ID code and locks the mobile telephone terminal against use when the number of writing tries exceeds a set number. Thus, even if an illegal user attempts to write in an ID code illegally, the mobile telephone terminal is rendered unusable after a number of tries. This prevents against unlawful use of the mobile telephone terminal.

An ID writing program for writing an ID code in the EEPROM 21e of the mobile telephone terminal is loaded in the mobile telephone terminal only at writing of the ID. This makes it even more difficult for an illegal user to write an ID code in the EEPROM, thereby preventing further the unlawful use of the mobile telephone terminal.

(b) Configuration of embodiment of invention

Overall Configuration

Figure 2:
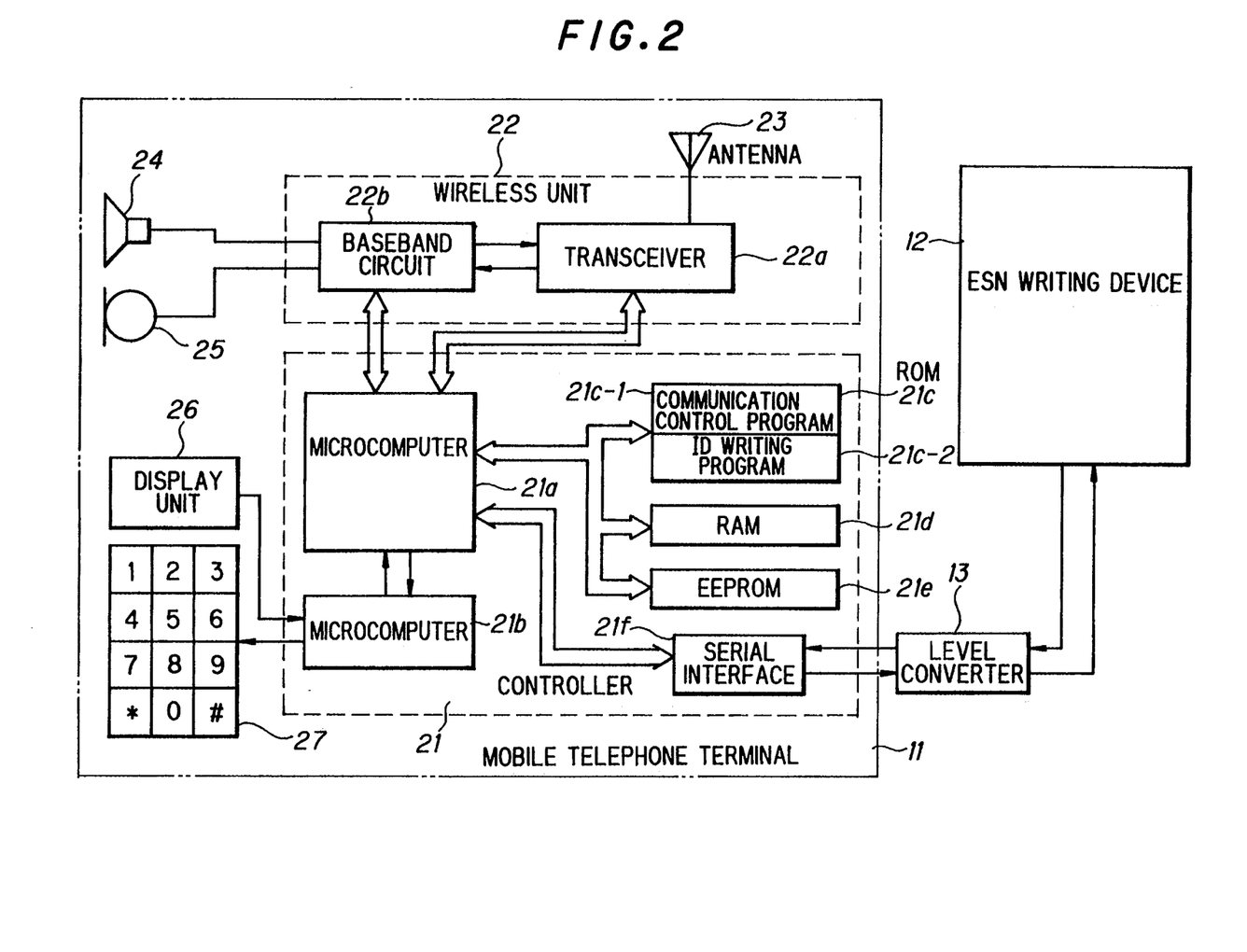
FIG. 2 is a block diagram illustrating an embodiment of the present invention.

FIG. 2 is a block diagram illustrating an embodiment of the present invention. Numeral 11 denotes the mobile telephone terminal, and numeral 12 designates the ESN writing device (ID-code writing device) for encrypting the first ID code (ESN) that identifies the apparatus and writing the encrypted ID code in the EEPROM incorporated within the mobile telephone terminal. A level converter 13 is connected between the mobile telephone terminal 11 and the writing device 12. The mobile telephone terminal 11 includes the controller 21 for controlling the overall mobile telephone terminal, as well as the wireless unit 22 for sending and receiving a voice signal and data. The wireless unit 22 has a transceiver 22a and a baseband circuit 22b. The mobile telephone terminal 11 further includes an antenna 23, a speaker 24, a microphone 25, a display unit 26 for displaying telephone numbers and the like, and a keyboard 27 for entering telephone numbers, etc.

The controller 21 includes a first microcomputer 21a for executing main control (communication control, ID writing control, etc.) of the mobile telephone terminal, a second microcomputer 21b for executing man-machine interface control (display control, keyboard control, etc.) of the mobile telephone terminal, a ROM 21c for storing processing programs, specifically a communication control program 21c-1 and an ID writing program 21c-2, a RAM 21d for storing results of processing, etc., the EEPROM 21e and a serial interface 21f for exchanging data with the ESN writing device 12.

Figure 3:
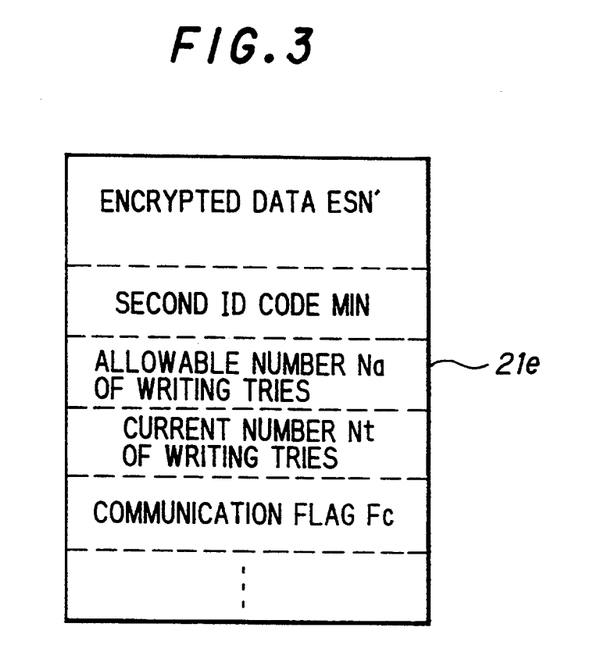
FIG. 3 is a diagram useful in describing the data stored in an EEPROM.

As illustrated in FIG. 3, the EEPROM 21e stores ID information (ESN'), which is the result of encrypting the first ID code ESN (electronic serial number), and the second ID code MIN (mobile identification number). It should be noted that the EEPROM 21e is furnished with a plurality of second ID-code storage areas so that a plurality of services may be received from the providers of communication services, as well as with areas for storing an allowable number of writing tries Na, a current number of writing tries Nt and a communication flag Fc, which indicates whether the mobile telephone terminal is usable or not. The numbers of tries Na, Nt and the flag Fc will be described later.

Figure 4:
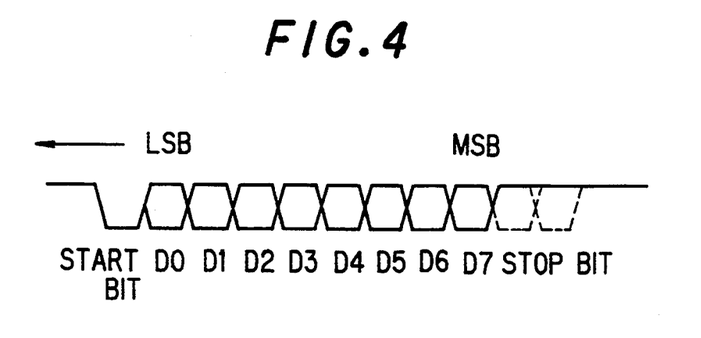
FIG. 4 is a diagram useful in describing a serial interface.

The serial interface 21f performs a bit-serial exchange of data with the ESN writing device 12 in accordance with an RS232 interface. The RS232 interface performs an exchange of data in an asynchronous and procedureless manner at a transmission speed of 1200 bps. The structure of the data is as shown in FIG. 4. Specifically, the data is composed of one start bit, eight data bits and two stop bits, for a total of 11 bits. The data is transferred in these units in the form of a bit serial.

Wireless Unit

Figure 5:
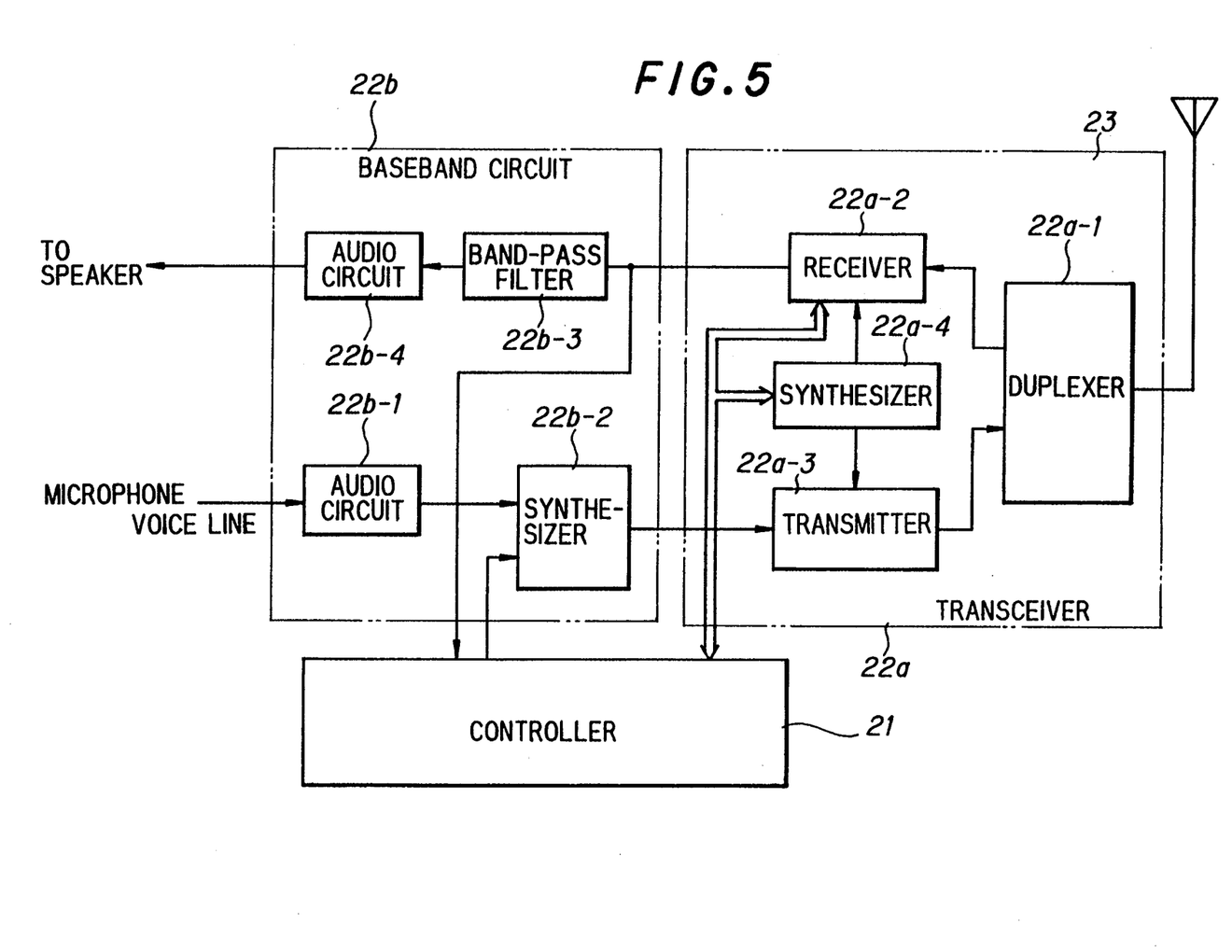
FIG. 5 is a block diagram of a wireless unit.

The wireless unit 22 is constructed as shown in FIG. 5. The transceiver 22a includes a duplexer 22a-1 for changing over the antenna between a receiving unit 22a-2 and a transmitting unit 22a-3. The receiving unit 22a-2 receives and demodulates radio waves from a base station, detects received electric field strength and inputs the same to the controller 21. The transmitting unit 22a-3 frequency-modulates and transmits a voice signal from the microphone 21b and data from the controller. The wireless unit 22 further includes a synthesizer 22a-4 for generating a frequency signal, which conforms to the prescribed base station, in response to a command from the controller 21.

The baseband circuit 22b includes a first audio circuit 22b-1 constituted by a band-pass filter or low-frequency amplifier (not shown) for passing a voice signal having a frequency of 0.3~3 KHz, a synthesizer 22b-2 for combining an audio signal with the data (10 Kb/s) outputted by the controller 21 and then inputting the result to the transmitting unit 22a-3, a 0.3~3 KHz band-pass filter 22b-3, to which the demodulated signal from the receiving unit 22a-2 is applied, for passing the voice signal contained in the demodulated signal, and a second audio circuit 22b-4 such as a low-frequency amplifier, the output of which is fed into the speaker 24.

ID Writing Processing

Figure 6:
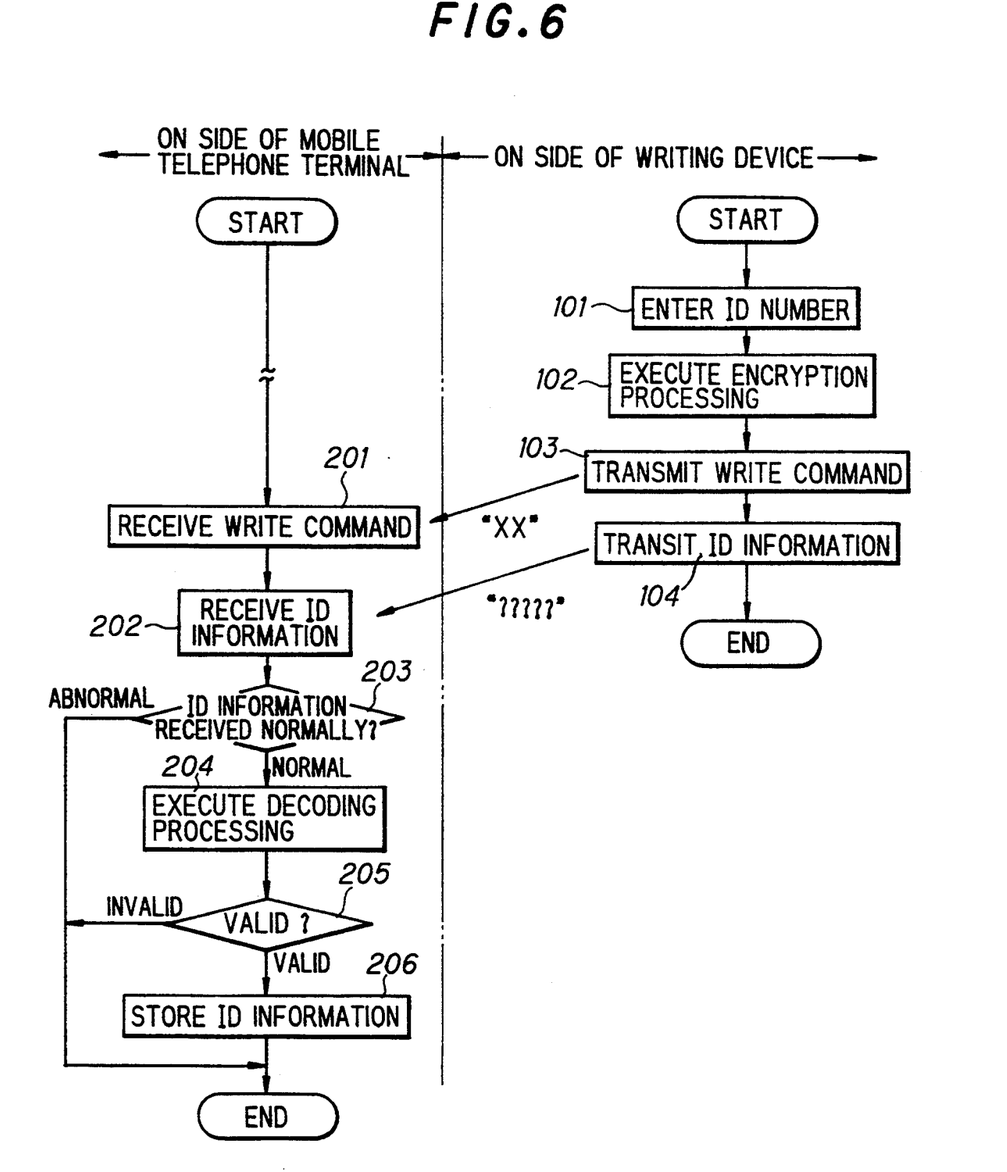
FIG. 6 is a flowchart of processing for writing ID information.

FIG. 6 is a flowchart of writing processing, and FIG. 7 is a diagram for describing an encryption procedure. Processing for encrypting the first ID code ESN and then writing the ID code in the EEPROM 21e will be described in accordance with these Figures.

When the ESN writing device 12 has reached the stage in which the first ID code ESN is to be written in the EEPROM 21e of the mobile telephone terminal 11, ID information is entered from the keyboard (step 101). The ID information is composed of four bytes, as indicated at numeral 41 in FIG. 7(a), and has a manufacture code MFC and the first ID code ESN. The manufacture code MFC, which is data indicating that the first ID code ESN is valid, is expressed by eight bits $C_0$~$C_7$ of the first byte. The first ID code ESN is expressed by 19 bits $N_0$~$N_{18}$ of the second through fourth bytes.

When the ID information is entered, the ESN writing device 12 encrypts the data of four bytes entered (step 102). At the time of encryption, each byte of the ID information 41 is divided into four higher order bits and four lower order bits, as depicted in (a) of FIG. 7. Next, the positions of the four higher order bits A, C, E, G and four lower order bits B, D, F, H are interchanged, after which the positions are shifted, as illustrated in (b) of FIG. 7. After the shift, the four bits of H and the four bits of A~G are subjected to an exclusive-OR operation and A~G are substituted by the results A'~G' of the exclusive-OR operation [see (c) of FIG. 7]. Thereafter, a check-sum adjust of one byte is applied, as shown in (d) of FIG. 7, after which coding processing is concluded. It should be noted that the value of the check sum is determined in such a manner that the logical sum of corresponding bits of five bytes b1~b5 will be 00000000.

In encryption processing is finished, the ESN writing device 12 transmits a write command to the mobile telephone terminal 11 (step 103), then transmits the encrypted ID information 42 [see (d) in FIG. 7] to the mobile telephone terminal (step 104) and terminates ID writing processing.

When the microcomputer 21a of the mobile telephone terminal 11 receives the write command, the microcomputer 21a starts processing the ID writing program 21c-2 (step 201).

When the ID information 42 is received (step 202), it is determined by the check sum of the received ID information whether the data is being received correctly (step 203). If the data is not being received normally, the microcomputer 21a terminates write processing so that the ID information is not written in the EEPROM 21e.

If the data is being received normally, the microcomputer 21a decodes the encrypted ID information 42 (step 204) through a procedure that is the reverse of the procedure for encryption and then determines whether the preset manufacture code MFC is contained in the decoded ID information (step 205).

If the manufacture code MFC is not contained in the decoded ID information, this means that the entered ID information is not valid and the microcomputer 21a terminates write processing so that ID information is not written in the EEPROM 21e. If the manufacture code MFC is contained in the decoded ID information, however, the microcomputer 21a writes the ID information 42, which has been sent from the ESN writing device 12, in the EEPROM 21e as is (step 206) and ends processing.

Thus, if the first ID code ESN is encrypted before being written in the EEPROM 21e and the second ID code MIN is written in the EEPROM 21e separately by the provider of a communication service, the mobile telephone terminal 11 will be capable of communicating with the telephone terminal of another party.

In a case where the mobile telephone terminal 11 is positionally registered with a network and a case where the terminal 11 places an outgoing call, it is required that the first and second ID codes ESN, MIN be transmitted to a wireless ground station. In such case, the microcomputer 21a reads the encrypted ID information out of the EEPROM 21e, decodes the ID information and transmits the first ID code ESN obtained and the second ID code MIN to the network. If the car phone exchange of the network receives the first and second ID codes, it determines whether this set of codes has been registered or not. If the set of codes has been registered, a speech path is established and communication is allowed. If the set of codes has not been registered, a speech path is not established Thus, in accordance with the present invention, the first ID code ESN is encrypted on the side of the ESN writing device 12. Therefore, even if the ID code such as MIN or ESN is acquired by intercepting the communication exchange between the mobile telephone terminal and the wireless ground station, the ID code cannot be encrypted and written in the EEPROM 21e without using the ESN writing device 12 in the possession of the manufacturer of them. This prevents against unlawful use of the mobile telephone terminal.

Figure 7A:
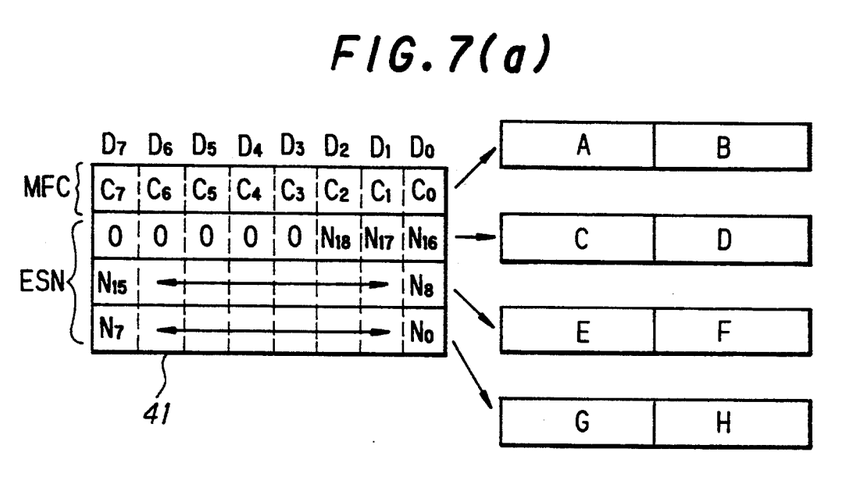
Figure 7B:
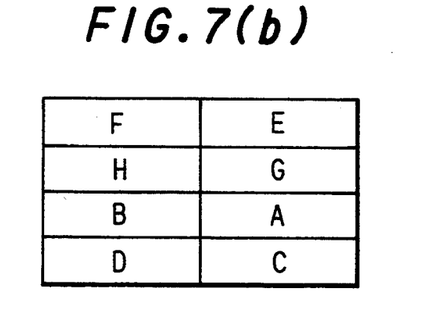
Figure 7C:
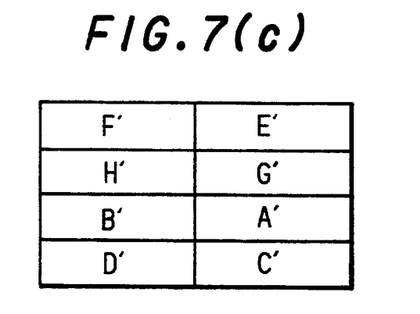
Figure 7D:
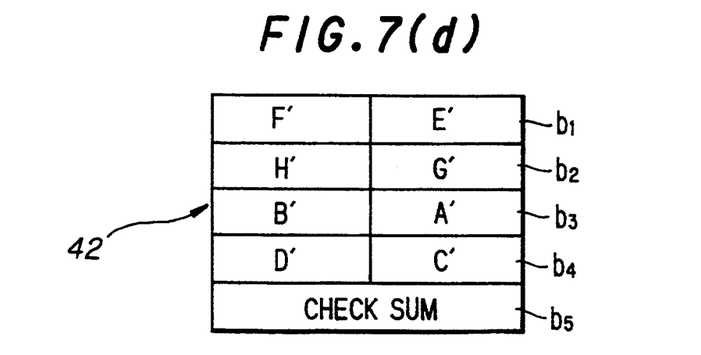

Further, the mobile telephone terminal 11 performs decoding processing before the encrypted ID information 42 [see FIG. 7(d)] is written in the EEPROM 21e and writes the encrypted ID information 42 in the EEPROM as is only if the data (the manufacture code MFC) indicating the validity of the first ID code is contained in the decoded ID information. As a result, an illegal user cannot write the first ID code in the EEPROM 21e, even if the ESN writing device 12 is used, without knowing the manufacture code. Thus the mobile telephone terminal is protected against unlawful use. It should be noted that although the effects mentioned above can be obtained if the manufacture code MFC is incorporated, this is not always necessary.

(c) Modifications

First Modification

In the embodiment described above, the validity of the encrypted ID code is checked before writing takes place in the ROM. It is further possible to discriminate the validity of the ID code, which has been written in the EEPROM 21e, when power is introduced to the mobile telephone terminal, and render the mobile telephone terminal unusable if the ID code is found to be invalid. Further, it is possible to adopt an arrangement in which the ID code is written in the EEPROM 21e without checking its validity, the validity of the ID code that has been written in the EEPROM is discriminated when power is introduced, and the mobile telephone terminal is rendered unusable if the ID code is found to be invalid.

Figure 8:
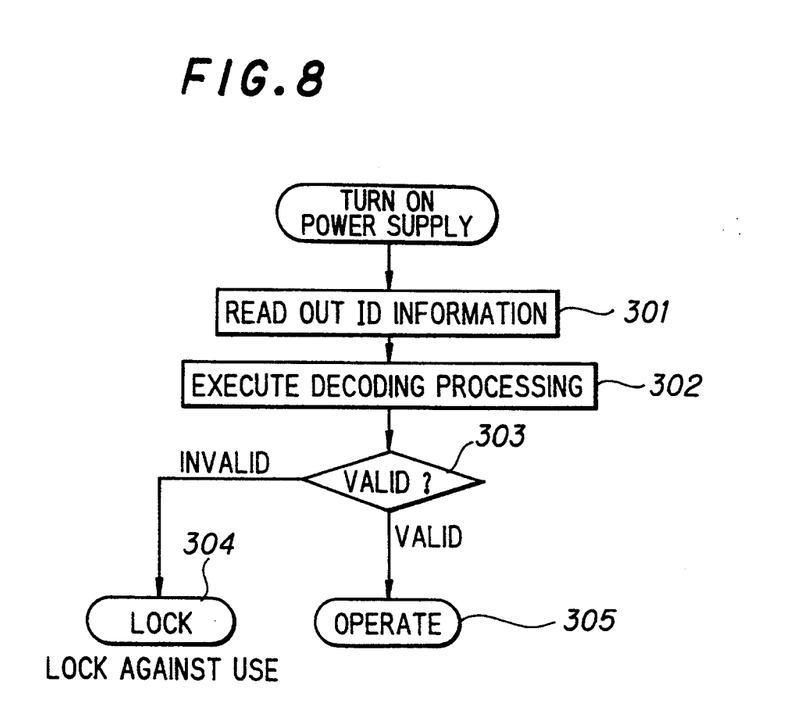

FIG. 8 is a flowchart of processing for verifying ID validity at the time power is introduced. At introduction of power, the microcomputer 21a (FIG. 2) reads the encrypted ID information out of the EEPROM 21e (step 301) in accordance with the communication control program 21c-1 and decodes the ID information through a procedure that is the reverse of the encrypting procedure (step 302).

Next, it is determined whether the preset manufacture code MFC is contained in the decoded ID information (step 303).

If the manufacture code MFC is not contained in the decoded ID information, then the decoded ID information is invalid, the mobile telephone terminal is locked in a state in which is cannot be used and an alarm display is presented indicating that the terminal is not usable (step 304). If the ID information is found to be valid, however, control is subsequently executed for positional registration, outgoing calls and incoming calls (step 305).

Second Modification

Figure 9:
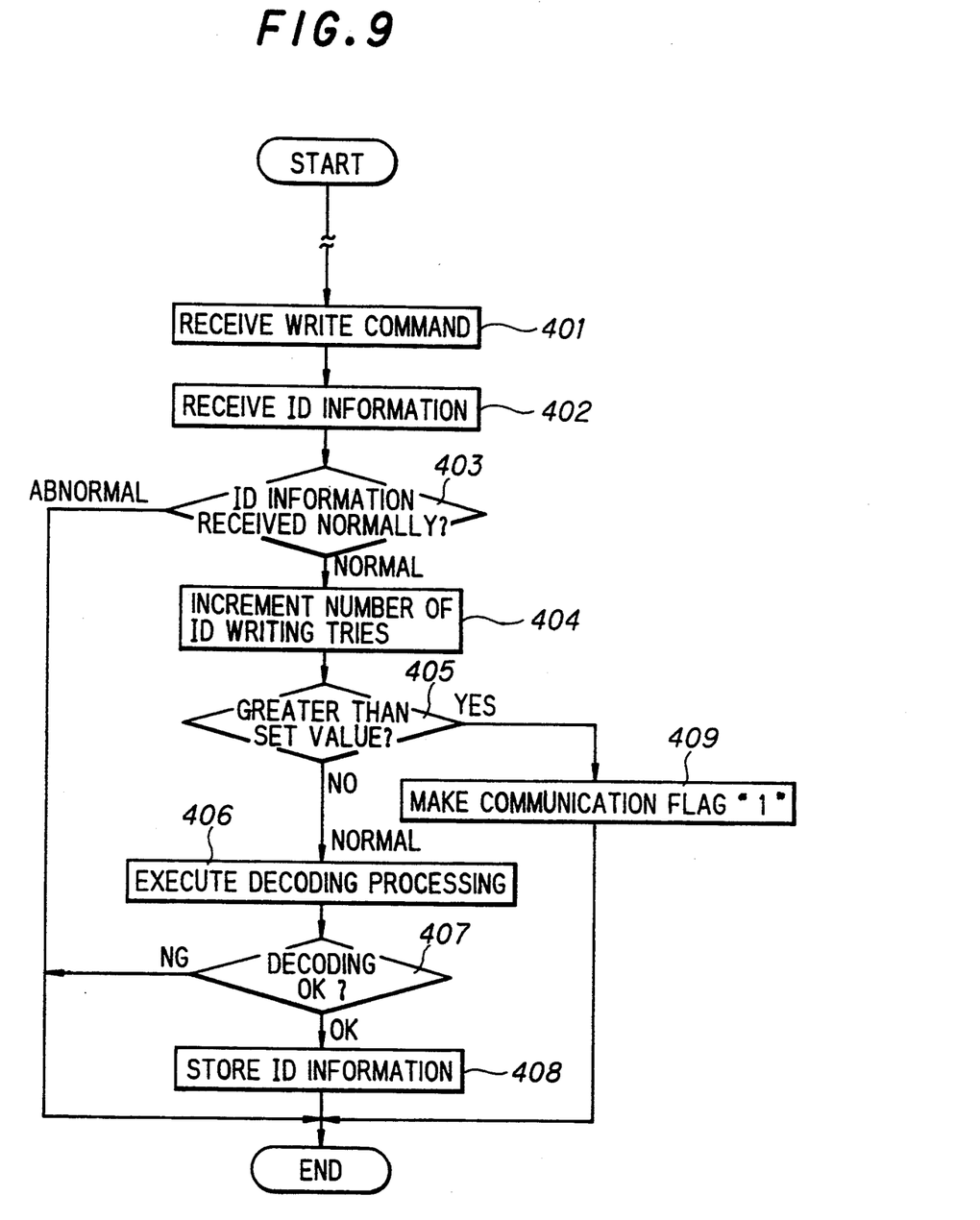
FIG. 9 is another flowchart of processing executed on the side of a mobile telephone terminal at the writing of ID information.
Figure 10:
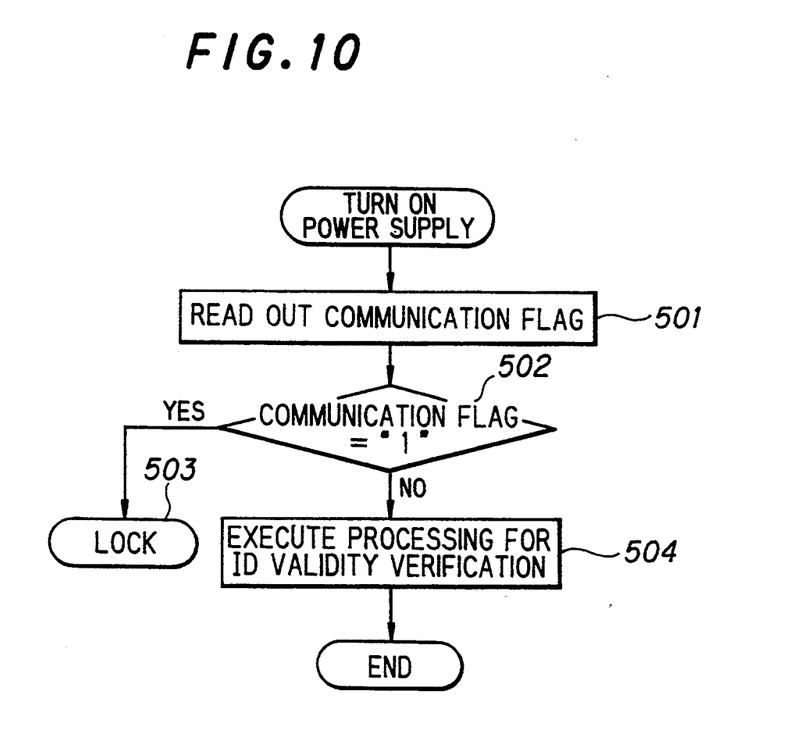
FIG. 10 is a flowchart of processing for verifying whether communication is possible or not.

A person who attempts to use the mobile telephone terminal unlawfully tries to write the ID information in the EEPROM and makes repeated attempts when success is not achieved. On the other hand, in the case of an individual writing the ID information legally, the ID information can be written in the EEPROM by a single write operation as long as a mistake is not made in entering the information. Accordingly, if a number Na of allowable write operations is set in advance and a person tries to write in the ID information a number of times in excess of the set number Na, this can be regarded as an attempt to write in the ID information unlawfully and the mobile telephone terminal can be locked against subsequent use. This arrangement makes it possible to prevent unlawful use of the mobile telephone terminal. FIGS. 9 and 10 are flowcharts of processing executed when performing writing on the side of the mobile telephone terminal and when introducing power, respectively, in the case mentioned above. It will be assumed that the allowable number Na of writing tries has been written in the EEPROM 21e in advance (see FIG. 3).

When the microcomputer 21a of the mobile telephone terminal 11 receives a write command, the microcomputer starts executing the ID writing program 21c-2 (step 401).

Next, upon receiving the ID information 42 [see (d) of FIG. 7] (step 402), the microcomputer 21a checks to determine, based upon the check sum of the received ID information, whether the data is being received correctly (step 403). If the data is not being received normally, the microcomputer 21a terminates write processing so that the ID information is not written in the EEPROM 21e.

If the data is being received normally, a number Nt (initially 0) of ID writing tries is incremented and then written in the EEPROM 21e (step 404). Next, the microcomputer determines whether $Nt > Na$ holds (step 405). If $Nt \leq Na$ holds, namely if the number of writing tries is equal to or less than the allowable number of tries, the received ID information ID is decoded (step 406) through a procedure that is the reverse of the procedure for encryption and then it is determined whether the preset manufacture code MFC is contained in the decoded ID information (step 407).

If the manufacture code is not contained in the decoded ID information, this means that the entered ID information is invalid and the microcomputer 21a terminates write processing so that the ID information is not written in the EEPROM 21e. If the manufacture code MFC is contained in the decoded ID information, the ID information 42 transmitted from the ESN writing device 12 is written in the EEPROM 21e as is (step 408) and processing is ended.

If $Nt > Na$ is found to hold at step 405, namely if the number of writing tries Nt is larger than the allowable number Na of tries, this means that someone is attempting to write ID information in the mobile telephone terminal unlawfully and therefore the microcomputer locks the mobile telephone terminal against subsequent use. For example, the communication flag Fc (initially "0") is made "1" and then written in the EEPROM 21e.

When power is introduced, the microcomputer 21a of the mobile telephone terminal 11 reads the communication flag Fc, which has been written in the EEPROM 21e, out of the EEPROM (step 501) and determines whether the communication flag Fc is "1" (step 502). If the communication flag Fc is "1", the mobile telephone terminal is locked in an unusable state and an alarm display indicating that the terminal cannot be used is presented (step 503). If the communication flag Fc is "0", on the other hand, then the processing shown in FIG. 8 for verifying ID validity is subsequently executed (step 504).

Third Modification

The foregoing relates to a case in which the ID writing program 21c-2 is built in the mobile telephone terminal 11. However, an arrangement can be adopted in which the ID writing program is loaded only when ID writing is performed, whereupon the processing for writing the ID is executed. More specifically, (1) rather than storing the ID writing program 21c-2 in the ROM 21c (FIG. 2), this program is loaded in the RAM 21d only when an ID is written. Alternatively, (2) rather than storing the ID writing program 21c-2 in the ROM 21c, this ROM is replaced by a ROM in which the ID writing program has been stored.

If this arrangement is adopted and combined with the methods already described, illicit writing of the EEPROM can be made even more difficult so that it is possible to prevent unlawful use of the mobile telephone terminal to an even greater degree.

Though the first and second ID codes are stored in an EEPROM in the arrangements described above, any writable non-volatile memory will suffice and the invention therefore is not limited to use of an EEPROM.

In accordance with the present invention, encryption is performed on the side of the ID writing device. This means that even if the ID code such as MIN or ESN is acquired by intercepting the communication exchange between the mobile telephone terminal and a wireless ground station, the ID code cannot be encrypted and written in a memory (an EEPROM, for example) without using the ID writing device possessed by the manufacturer of the mobile telephone terminal. This makes it possible to prevent unlawful use of the mobile telephone terminal.

Further, in accordance with the present invention, data indicating validity of the first ID code ESN is combined with the first ID code and the resulting ID code is encrypted by the ID writing device. The ID writing means of the mobile telephone terminal decodes the entered encrypted data, judges whether the data indicating the validity of the first ID code is contained in the decoded data and writes the encrypted data in the memory only if the validity data is contained in the decoded data. In accordance with this arrangement, an illegal user is incapable of writing the first and second ID codes in the memory, even if the writing device is employed, without knowing the nature of the validity data. As a result, unlawful use of the mobile telephone terminal can be prevented.

Furthermore, data indicating validity of the first ID code is combined with the first ID code and the resulting ID code is encrypted by the writing device. The mobile telephone terminal writes the entered encrypted data in the EEPROM. When the power supply of the mobile telephone terminal is turned on, the terminal decodes the encrypted data and judges whether the data indicating the validity of the first ID code is contained in the decoded data. The mobile telephone terminal is made unusable if validity data is not contained in the decoded data. In accordance with this arrangement, an illegal user is incapable of using the mobile telephone terminal without knowing the nature of the validity data. As a result, unlawful use of the mobile telephone terminal can be prevented.

In accordance with the present invention, the number of tries at writing an ID code is monitored and the mobile telephone terminal is locked against use when the number of writing tries exceeds a set number. Thus, even if an illegal user attempts to write in an ID code illegally, the mobile telephone terminal is rendered unusable after a number of tries. This prevents against unlawful use of the mobile telephone terminal.

Further, in accordance with the invention, an ID writing program for writing an ID code in the mobile telephone terminal is loaded in the mobile telephone terminal only at writing of the ID. This makes it even more difficult for an illegal user to write an ID code in the memory, thereby preventing further the unlawful use of the mobile telephone terminal.

As many apparently widely different embodiments of the present invention can be made without departing from the spirit and scope thereof, it is to be understood that the invention is not limited to the specific embodiments thereof except as defined in the appended claims.

What is claimed is:

1. A method of preventing unlawful use of a mobile telephone terminal in a mobile communication system in which a first ID code for apparatus identification and a second ID code such as a telephone number are stored beforehand in a non-volatile memory of a mobile telephone terminal, the ID codes are transmitted to a network when communication is performed, it is determined on the network side whether the set of first and second ID codes has been registered and communication is allowed if the set of first and second ID codes has been registered, said method comprising the steps of:

encrypting the first ID code and receiving an encrypted first ID code in the mobile telephone terminal;

writing the encrypted first ID code in the non-volatile memory as is by the mobile telephone terminal; and decoding the encrypted first ID code at communication and transmitting the first ID code obtained to the network along with the second ID code.

2. A method of preventing unlawful use of a mobile telephone terminal in a mobile communication system in which a first ID code for apparatus identification and a second ID code such as a telephone number are stored beforehand in a non-volatile memory of a mobile telephone terminal, the ID codes are transmitted to a network when communication is performed, it is determined on the network side whether the set of first and second ID codes has been registered and communication is allowed if the set of first and second ID codes has been registered, said method comprising the steps of:

receiving and encrypting data obtained by combining data including validity of the first ID code with said first ID code to obtain the resulting encrypted data;

decoding the encrypted data before the encrypted data is written in the non-volatile memory;

judging whether the data indicating the validity of the first ID code is contained in the decoded data; and writing the encrypted data in the non-volatile memory as is if the data indicating validity is contained in the decoded data; and decoding an obtained encrypted first ID code at communication and transmitting the first ID code to the network along with the second ID code.

3. The method according to claim 1, further comprising the steps of:

monitoring number of tries at writing an ID code; and locking the mobile telephone terminal against use when the number of tries exceeds a set number.

4. A method of preventing unlawful use of a mobile telephone terminal in a mobile communication system in which a first, ID code for apparatus identification and a second ID code such as a telephone number are stored beforehand in a non-volatile memory of a mobile telephone terminal, the ID codes are transmitted to a network when communication is performed, it is determined on the network side whether the set of first and second ID codes has been registered and communication is allowed if the set of first and second ID codes has been registered, said method comprising the steps of:

receiving and encrypting data obtained by combining data indicating validity of the first ID code with said first ID code to obtain the resulting encrypted data;

writing the encrypted data in the non-volatile memory;

decoding the encrypted data when power is supplied to the mobile telephone terminal;

judging whether the data indicating the validity of the first ID code is contained in the decoded data; and rendering the mobile telephone terminal unusable if the data indicating validity is not contained in the decoded data; and decoding an obtained encrypted first ID code at communication and transmitting the first ID code to the network along with the second ID code.

5. The method according to claim 1, wherein an ID writing program for writing an ID code is loaded in a memory of the mobile telephone terminal only when an ID code is written.

6. A mobile telephone terminal in a mobile communication system in which a first ID code for apparatus identification and a second ID code such as a telephone number are stored beforehand in a non-volatile memory of a mobile telephone terminal, the ID codes are transmitted to a network when communication is performed, it is determined on the network side whether the set of first and second ID codes has been registered and communication is allowed if the set of first and second ID codes has been registered, said terminal comprising:

a code receiver for receiving and encrypting the first ID code;

code writing means for writing an encrypted first ID code in the non-volatile memory as is;

decoding means for decoding the encrypted first ID code at communication; and a transmitter for transmitting the decoded first ID code to the network along with the second ID code.

7. The terminal according to claim 6, further comprising:

means for monitoring number of tries at writing an ID code; and means for locking the mobile telephone terminal against use when the number of tries exceeds a set number.

8. A mobile telephone terminal in a mobile communication system in which a first ID code for apparatus identification and a second ID code such as a telephone number are stored beforehand in a non-volatile memory of a mobile telephone terminal, the ID codes are transmitted to a network when communication is performed, it is determined on the network side whether the set of first and second ID codes has been registered and communication is allowed if the set of first and second ID codes has been registered, said terminal comprising:

a code receiver for receiving encrypted data obtained by combining the first ID code and data indicating the validity thereof and encrypting the result;

validity judging means for decoding the encrypted data before the encrypted data received is written in the non-volatile memory and judging whether the data indicating the validity of the first ID code is contained in the decoded data;

data writing means for writing the encrypted data in the non-volatile memory as is if the data indicating validity is contained in the decoded data, and for refraining from writing the encrypted data in the non-volatile volatile memory if the data indicating validity is not contained in the decoded data;

decoding means for decoding the encrypted first ID code at communication; and a transmitter for transmitting the decoded first ID code to the network along with the second ID code.

9. A mobile telephone terminal in a mobile communication system in which a first ID code for apparatus identification and a second ID code such as a telephone number are stored beforehand in a non-volatile memory of a mobile telephone terminal, the ID codes are transmitted to a network when communication is performed, it is determined on the network side whether the set of first and second ID codes has been registered and communication is allowed if the set of first and second ID codes has been registered, said terminal comprising:

a code receiver for receiving encrypted data obtained by combining the first ID code and data indicating the validity thereof and encrypting the result;

writing means for writing the encrypted data in the non-volatile memory means;

means for decoding the encrypted data when power is introduced to the mobile telephone terminal;

means for judging whether the data indicating the validity of the first ID code is contained in the decoded data;

means for rendering the mobile telephone terminal unusable if the data indicating validity of the first ID code is not contained in the decoded data; and a transmitter for decoding the encrypted first ID code at communication and transmitting the decoded first ID code to the network along with the second ID code.

* * * * *